US011804320B2

(12) United States Patent
Shikama

(10) Patent No.: US 11,804,320 B2
(45) Date of Patent: Oct. 31, 2023

(54) CAMERA DEVICE AND PORTABLE ELECTRONIC DEVICE

(71) Applicant: AAC Optics (Suzhou) Co., Ltd., Suzhou (CN)

(72) Inventor: Kazuo Shikama, Osaka (JP)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 63 days.

(21) Appl. No.: 17/732,521

(22) Filed: Apr. 29, 2022

(65) Prior Publication Data

US 2023/0317340 A1    Oct. 5, 2023

(30) Foreign Application Priority Data

Mar. 31, 2022  (JP) ................................ 2022-060631

(51) Int. Cl.

| | |
|---|---|
| *H01F 7/08* | (2006.01) |
| *G02B 13/00* | (2006.01) |
| *G03B 13/36* | (2021.01) |
| *H04N 23/54* | (2023.01) |
| *H04N 23/68* | (2023.01) |

(Continued)

(52) U.S. Cl.
CPC ........... *H01F 7/081* (2013.01); *G02B 13/001* (2013.01); *G03B 13/36* (2013.01); *H04N 23/54* (2023.01); *H04N 23/55* (2023.01); *H04N 23/57* (2023.01); *H04N 23/687* (2023.01);

(Continued)

(58) Field of Classification Search
CPC ...... H01F 7/06; H01F 7/081; H01F 2007/083; H01F 2007/085; H01F 2007/086; H04N 23/50; H04N 23/51; H04N 23/54; H04N 23/55; H04N 23/57; H04N 23/685; H04N 23/687; H02P 25/034; G02B 13/01; G03B 13/36; G03B 17/02; G03B 30/00; G03B 2217/00; G03B 2217/002; G03B 2205/0053; G03B 2205/0069; H04M 1/0264; H05K 2201/10121; B60R 11/04; G06F 1/1686

See application file for complete search history.

(56) References Cited

U.S. PATENT DOCUMENTS

| 10,197,887 B2 * | 2/2019 | Enta ......................... G03B 5/00 |
|---|---|---|
| 11,122,205 B1 * | 9/2021 | Sharma .................. H04N 23/54 |

(Continued)

*Primary Examiner* — Twyler L Haskins
*Assistant Examiner* — Akshay Trehan
(74) *Attorney, Agent, or Firm* — W&G Law Group

(57) ABSTRACT

Provided is a camera device including a housing having accommodation cavity; an optical imaging part placed in the accommodation cavity and including lens having optical axis and drive mechanism; and an anti-shake mechanism placed in the accommodation cavity and including first movable part, first fixed part, first coil, first magnet, filter and photosensitive sensor. The drive mechanism includes second magnet to drive the lens. The first magnet, the first coil and the second magnet are successively arranged at intervals along optical axis direction, and the first coil is simultaneously under action of the first and second magnets to drive the first movable part. Compared with the related art, the first coil can utilize the magnetic fluxes of the first and second magnets at the same time, so that the first movable part fixed with the first coil can receive larger driving force, thereby improving efficiency of shake correction.

10 Claims, 9 Drawing Sheets

(51) Int. Cl.
*H04N 23/57* (2023.01)
*H04N 23/55* (2023.01)
*H04N 23/67* (2023.01)
*H04M 1/02* (2006.01)

(52) U.S. Cl.
CPC ... *G03B 2205/0069* (2013.01); *H04M 1/0264* (2013.01); *H04N 23/67* (2023.01)

(56) References Cited

U.S. PATENT DOCUMENTS

| | | | |
|---|---|---|---|
| 11,536,930 B2 * | 12/2022 | Eromäki | H04N 23/57 |
| 2017/0343767 A1 * | 11/2017 | Eromäki | G02B 7/08 |
| 2018/0173080 A1 * | 6/2018 | Enta | H04N 23/57 |
| 2023/0029593 A1 * | 2/2023 | Wang | H04N 23/65 |

\* cited by examiner

B-B

CAMERA DEVICE AND PORTABLE ELECTRONIC DEVICE

TECHNICAL FIELD

The present disclosure relates to the technical field of camera devices and, in particular, to a camera device and a portable electronic device.

BACKGROUND

With the rapid development of photographing technology, camera devices including lenses are widely used in various portable electronic devices, such as portable phones, tablet computers, and the like.

In general, a camera device applied to a general portable electronic device includes a drive mechanism for adjusting the focus in an optical axis direction and a camera shake correction mechanism for driving in a plane orthogonal to the optical axis direction.

The driving function is achieved by coils and magnets, and the coils are fixed to an outer periphery of a lens carrier. When a current is applied to the coil, the coil moves the lens carrier along the optical axis direction of the lens under the action of electromagnetic force, thereby enabling focusing.

In addition, when a user takes an image while holding the electronic device by hand, the camera shake can be corrected by driving in a direction perpendicular to the optical axis for compensating shake of the camera device caused by the hand.

However, as a small device mounted on for example a portable electronic device, a camera shake correction mechanism in an optical system such as a medium-telephoto lens with a long total optical length is difficult to achieve in a highly integrated miniaturized mechanism with low height due to the length of the driving extent and the weight of the lens.

Moreover, since the drive mechanism for adjusting the focus which is driven in the optical axis direction and the camera shake correction mechanism which is driven in a plane orthogonal to the optical axis are integrated to each other, a mechanism for suppressing natural vibrations and a mechanism for centering adjustment of the lens and the like are further needed. As a result, time-consuming assembling and difficulty of design tend to increase.

SUMMARY

The purpose of the present disclosure is to provide a camera device and a portable electronic device to solve the technical problems in the related art, which can simplify the structure and reduce the occupied space.

The present disclosure provides a camera device, including a housing having an accommodation cavity; an optical imaging part placed in the accommodation cavity, the optical imaging part including a lens having an optical axis and a drive mechanism configured to drive the lens; and an anti-shake mechanism placed in the accommodation cavity, the anti-shake mechanism including a first movable part, a first fixed part, a first coil, a first magnet, a filter and a photosensitive sensor. The first movable part is supported on the first fixed part by a ball in a rolling manner, the first coil, the filter and the photosensitive sensor are fixed to the first movable part, the first magnet is fixed to the first fixed part, and the first magnet and the first coil are spaced apart from each other. The drive mechanism includes a second magnet configured to drive the lens. The first magnet, the first coil and the second magnet are successively arranged at intervals along an optical axis direction, and the first coil is simultaneously under action of the first magnet and the second magnet to drive the first movable part.

As an improvement, a plurality of groups of first magnets and a plurality of groups of second magnets are provided, the plurality of groups of first magnets and the plurality of groups of second magnets are arranged in one-to-one correspondence surrounding the optical axis. Each group of first magnets includes two first magnets arranged along a direction perpendicular to the optical axis direction, and the first magnets have opposite magnetization directions along the optical axis direction. Each group of second magnets is magnetized along the direction perpendicular to the optical axis direction, and each group of second magnets and a corresponding group of first magnets that is facing the group of second magnets have opposite magnetic pole distribution directions.

As an improvement, the first movable part is able to translate in a first direction and a second direction that are orthogonal to the optical axis direction and is able to rotate in a plane defined by the first direction and the second direction, and the first direction is perpendicular to the second direction. The anti-shake mechanism has a first axis parallel to the first direction and a second axis parallel to the second direction, the optical axis passes through an intersection point of the first axis and the second axis. A plurality of groups of first coils are provided and arranged around the optical axis, the plurality of groups of first coils are rotationally symmetrical about the intersection point, and the plurality of groups of first coils are asymmetrically distributed with respect to the first axis and the second axis.

As an improvement, the optical imaging part has an auto-focusing lens structure, and the driving mechanism further includes a second movable part, a second fixed part, an elastic support part and a second coil. The lens and the second coil are fixed to the second movable part, the second magnet is fixed to the second fixed part, the second magnet and the second coil are spaced apart from each other, and two ends of the elastic support part are respectively connected to the second movable part and the second fixed part, so as to suspend the second movable part in the accommodation cavity.

As an improvement, the optical imaging part abuts the anti-shake structure in a detachable manner along the optical axis direction.

As an improvement, the optical imaging part is a periscope lens structure or a zoom lens structure.

As an improvement, a first protrusion protrudes from a backlight side of the first movable part in the optical axis direction, and a first groove is recessed on an end surface of the first protrusion away from the first movable part. A second groove is recessed on a light-receiving side of the first fixed part in the optical axis direction, and the second groove corresponds to the first groove. The photosensitive sensor is fixed on the first protrusion, one end of the photosensitive sensor extends into the first groove, and the other end of the photosensitive sensor extends into the second groove. A stepped groove runs through the light-receiving side of the first movable part in the optical axis direction, and the stepped groove corresponds to the first groove and penetrates to communicate with the first groove, the filter is fixed in the stepped groove, and the filter and the photosensitive sensor are arranged at intervals along the optical axis direction.

As an improvement, a third groove is recessed on the backlight side the first movable part in the optical axis direction, a yoke is fixed in the third groove, and the yoke is in one-to-one correspondence with the first magnet.

As an improvement, a second protrusion protrudes from a backlight side of the first movable part in the optical axis direction, and a fourth groove is recessed on an end surface of the second protrusion away from the first movable part, and a first plate is arranged in the fourth groove. A fifth groove is recessed on a light-receiving side of the first fixed part in the optical axis direction, the fifth groove corresponds to the fourth groove, and a second plate is arranged in the fifth groove. The ball is arranged between the first plate and the second plate, one end of the ball close to the first movable part extends into the fourth groove and is in rolling connection with the first plate, and one end of the ball close to the first fixed part extends into the fifth groove and is in rolling connection with the second plate, so that the first movable part is able to reciprocate in a plane orthogonal to the optical axis direction.

The present disclosure also provides a portable electronic device including the aforementioned camera device.

Compared with the related art, in the present disclosure, the first magnet, the first coil and the second magnet are arranged at intervals along the optical axis direction, and the first coil is arranged between the first magnet and the second magnet, so that the first coil can use the magnetic flux of the first magnet and the second magnet at the same time, the first movable part to which the first coil is fixed can receive a larger driving force, thereby improving the efficiency of the camera shake correction.

Figure 1:
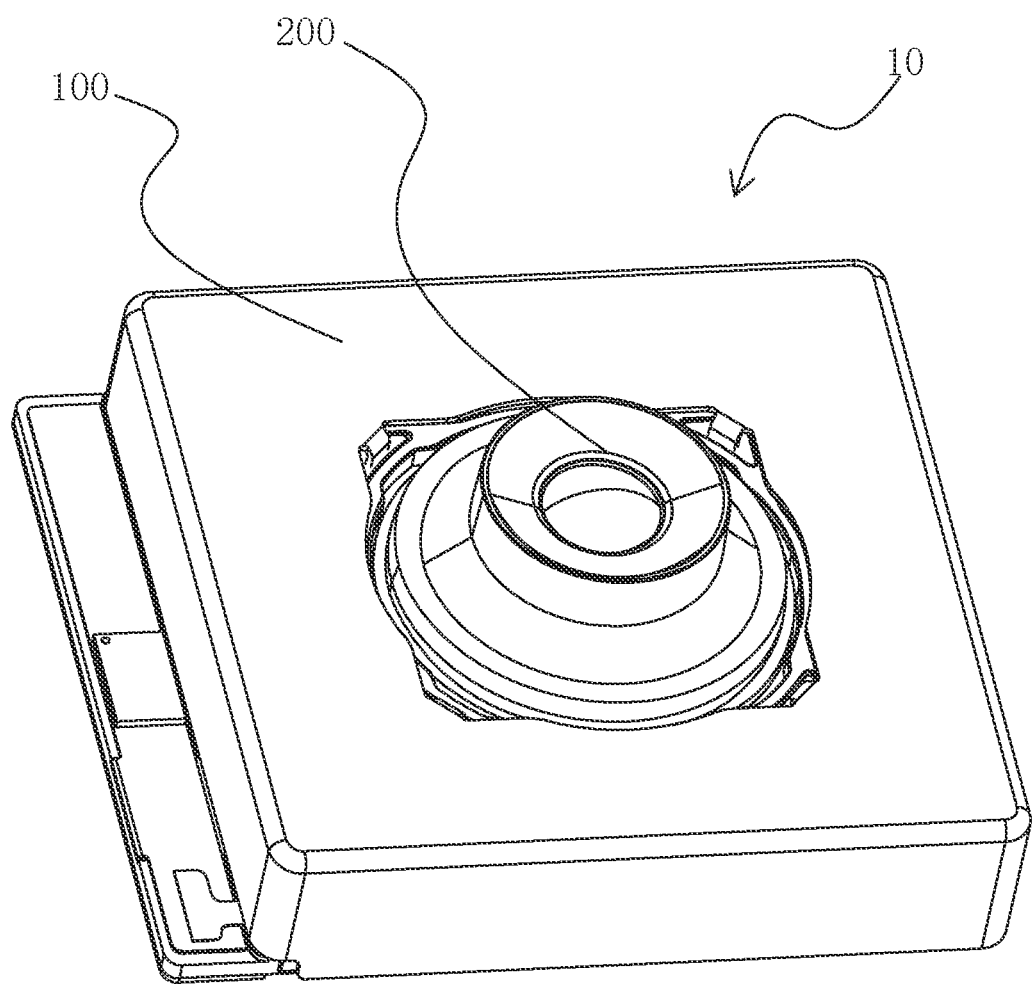
FIG. 1 is a perspective view of an overall structure of a camera device according to an embodiment of the present disclosure.
Figure 2:
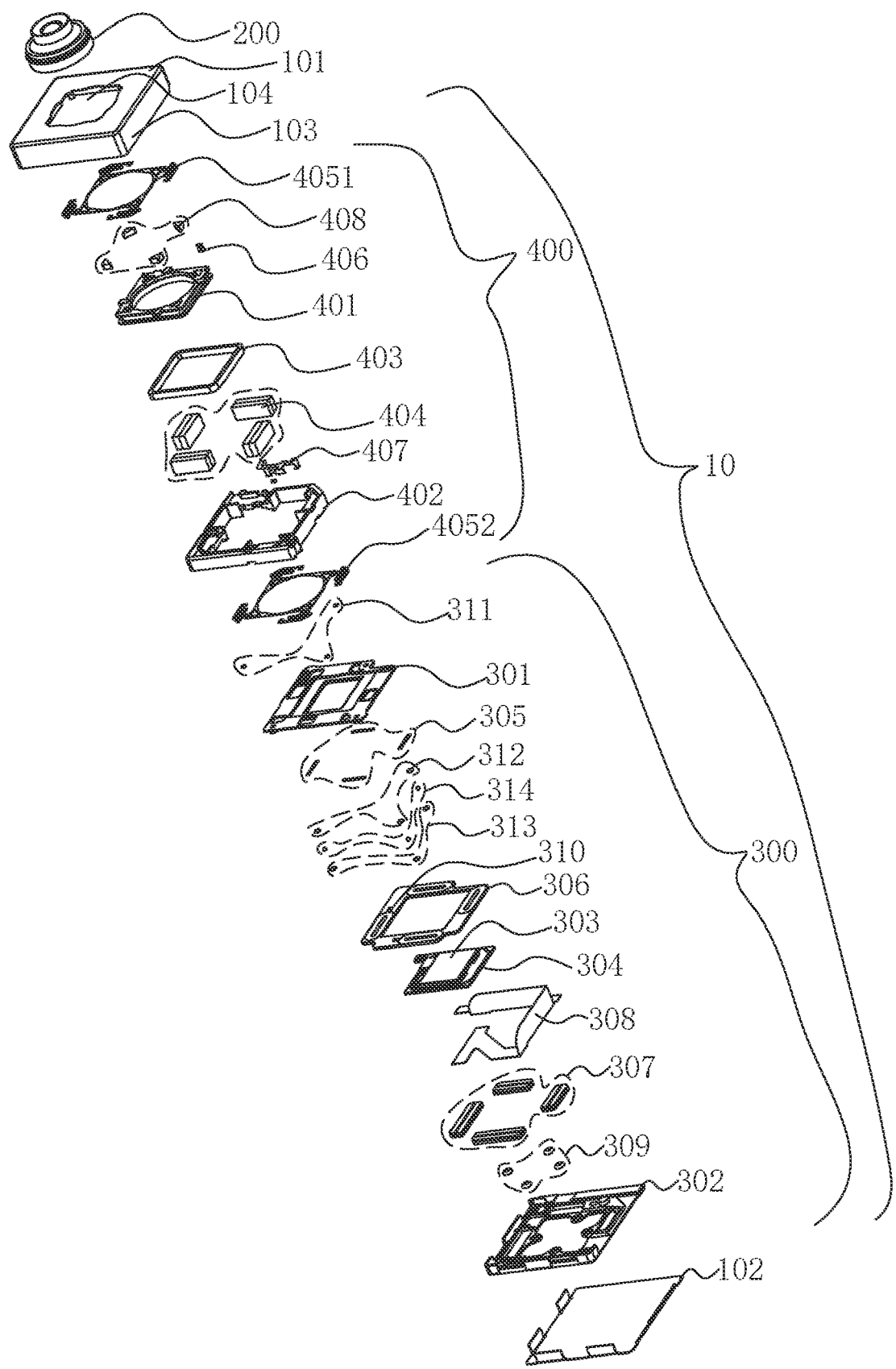
FIG. 2 is an exploded perspective view of an overall structure of a camera device according to an embodiment of the present disclosure.
Figure 3:
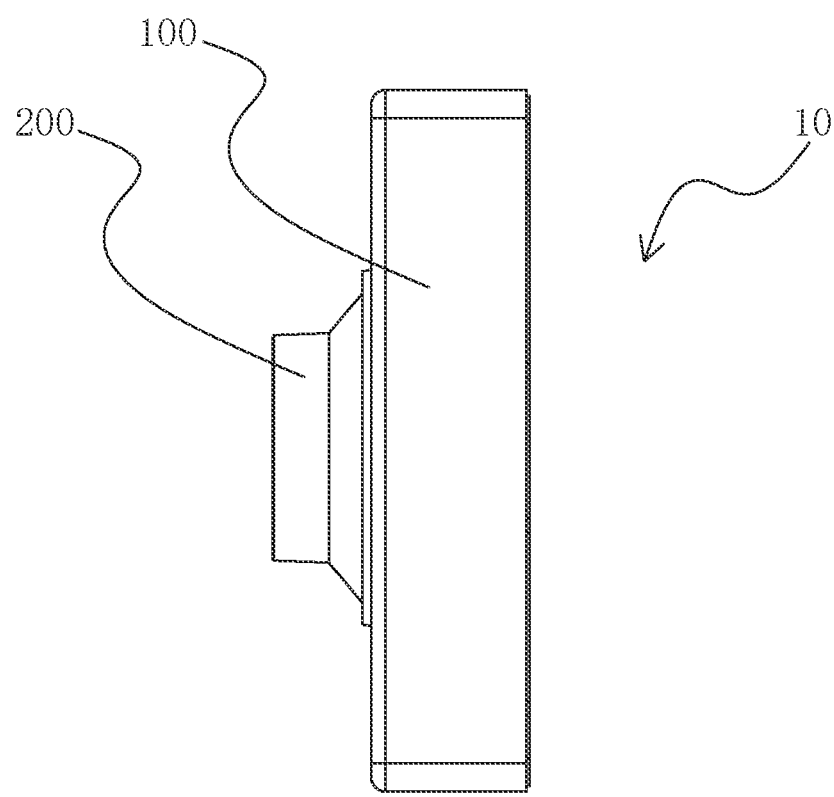
FIG. 3 is a side view of an overall structure of a camera device according to an embodiment according to the present disclosure.
Figure 4:
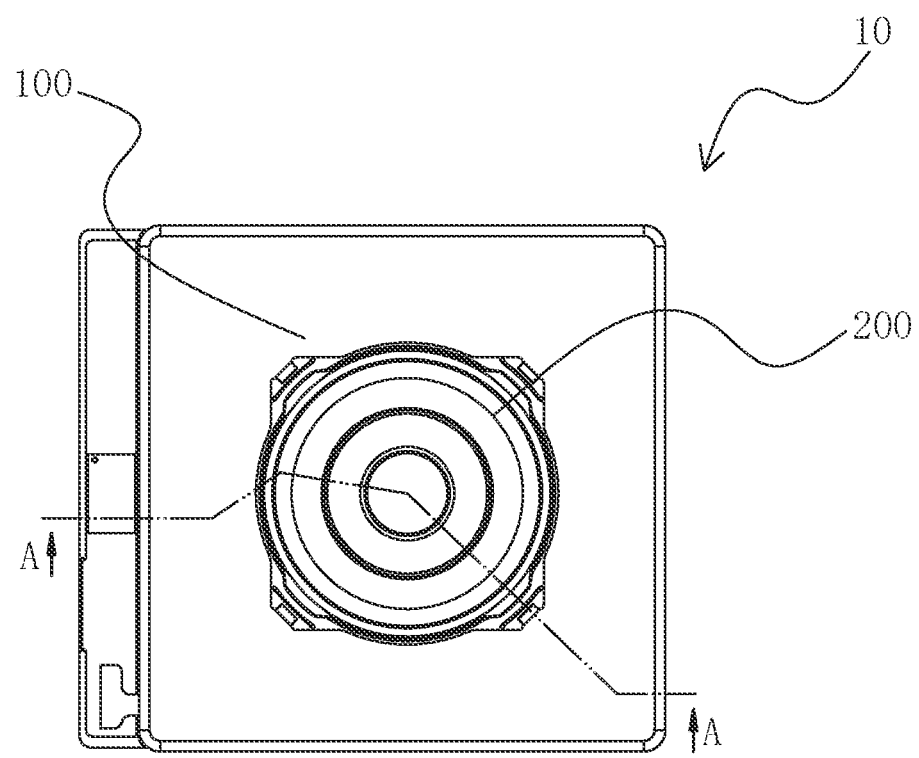
FIG. 4 is a top view of an overall structure of a camera device according to an embodiment according to the present disclosure.

REFERENCE SIGNS 10-camera device;
20-portable electronic device;
100-housing, 100a-accommodation cavity, 101-top wall, 102-bottom wall, 103-peripheral wall, 104-through hole;
200-lens;
300-anti-shake mechanism, 301-first movable part, 3011-first protrusion, 3012-first groove, 3013-stepped groove, 3014-third groove, 3015-second protrusion, 3016-fourth groove, 3017-third protrusion, 302-first fixed part, 3021-second groove, 3022-fifth groove, 303-filter, 304-photosensitive sensor, 305-yoke, 306-first coil, 307-first magnet, 308-first flexible conductive substrate, 309-thermal conductive member, 310-first position detection element, 311-first shock-proof buffer, 312-first plate, 313-second plate, 314-ball, 315-first axis, 316-second axis;
400-drive mechanism, 401-second movable part, 402-second fixed part, 403-second coil, 404-second magnet, 405-elastic support part, 4051-upper leaf spring, 4052-lower leaf spring, 406-second position detection element, 407-second flexible conductive substrate, 408-second shock-proof buffer;
500-optical axis;
600-periscope lens structure, 601-first prism, 602-second prism;
700-zoom lens structure;
D1-first direction;
D2-second direction.

DESCRIPTION OF EMBODIMENTS

Embodiments described below with reference to the accompanying drawings are exemplary and are only used to explain the present disclosure, but not to be construed as limitations to the present disclosure.

As shown from FIG. 1 to FIG. 11, an embodiment of the present disclosure provides a camera device 10, which includes a housing 100 having an accommodation cavity 100a, an optical imaging part placed in the accommodation cavity 100a, and an anti-shake mechanism 300. The optical imaging part includes a lens 200 having an optical axis 500 and a drive mechanism 400 for driving the lens 200. The optical imaging part and the anti-shake mechanism 300 are arranged successively along a direction of the optical axis 500, and the lens 200 is located on a light-receiving side of the optical axis 500.

The housing 100 includes a top wall 101, a bottom wall 102 and a peripheral wall 103. The peripheral wall 103 is connected to the top wall 101 and the bottom wall 102. The accommodation cavity 100a is surrounded by the top wall 101, the bottom wall 102 and the peripheral wall 103. A through hole 104 is provided communicating with the accommodation cavity 100a for at least part of the lens 200 to protrude therefrom.

The anti-shake mechanism 300 includes a first movable part 301, a first fixed part 302, a first coil 306, a first magnet 307, a filter 303 and a photosensitive sensor 304. The first fixed part 302 is fixed in the accommodation cavity 100a, and the first movable part 301 is movably disposed in the accommodation cavity 100a. The first movable part 301 is supported on the first fixed part 302 through rolling of a ball 314. The first movable part 301 can move in a plane orthogonal to the direction of the optical axis 500. The first magnet 307 is fixed on the first fixed part 302. The first coil 306, the filter 303 and the photosensitive sensor 304 are all fixed on the first movable part 301.

The filter 303 is closer to the light-receiving side of the optical axis 500 than the photosensor 304. In some embodiments, the filter 303 is an infrared cut filter 303, which generally protects the photosensor 304 and blocks undesired wavelengths, filtering out undesired light and passing only visible light.

The first coil 306, the filter 303, signal lines and power lines of the photosensitive sensor 304 can be disposed outside the anti-shake mechanism 300 through the first flexible conductive substrate 308, so as not to block the operation of the anti-shake mechanism 300. Optionally, the accommodation cavity 100a is provided with space for free movement, so that at least when the curved surface of the first flexible conductive substrate 308 moves in the plane, it will not block the movement of the anti-shake mechanism 300.

The anti-shake mechanism 300 uses the first movable part 301 to move the filter 303 and the photosensitive sensor 304 in a plane orthogonal to the optical axis 500 to perform hand-shake correction. At the same time, the first coil 306, the filter 303 and the photosensitive sensor 304 are fixedly connected to the first movable part 301, thereby realizing the low height and miniaturization of the camera device 10, simplifying the structure and reducing the occupied space, and improving the quality of the image. The working principle of the above-mentioned anti-shake mechanism 300 is as follows: when the first coil 306 is energized, through the interaction between the magnetic field of the first magnet 307 and the current flowing in the first coil 306, a Lorentz force is generated in the first coil 306. The direction of the Lorentz force is a direction orthogonal to the direction of the magnetic field of the first magnet 307 and the direction of the current flowing in the first coil 306. Since the first magnet 307 is fixed, a reaction force acts on the first coil 306. This reaction force becomes the driving force of the first movable part 301, and the first movable part 301 having the first coil 306 moves in a plane orthogonal to the direction of the optical axis 500, thereby performing anti-shake correction.

The driving mechanism 400 includes a second magnet 404 for driving the lens 200 to move.

Figure 5:
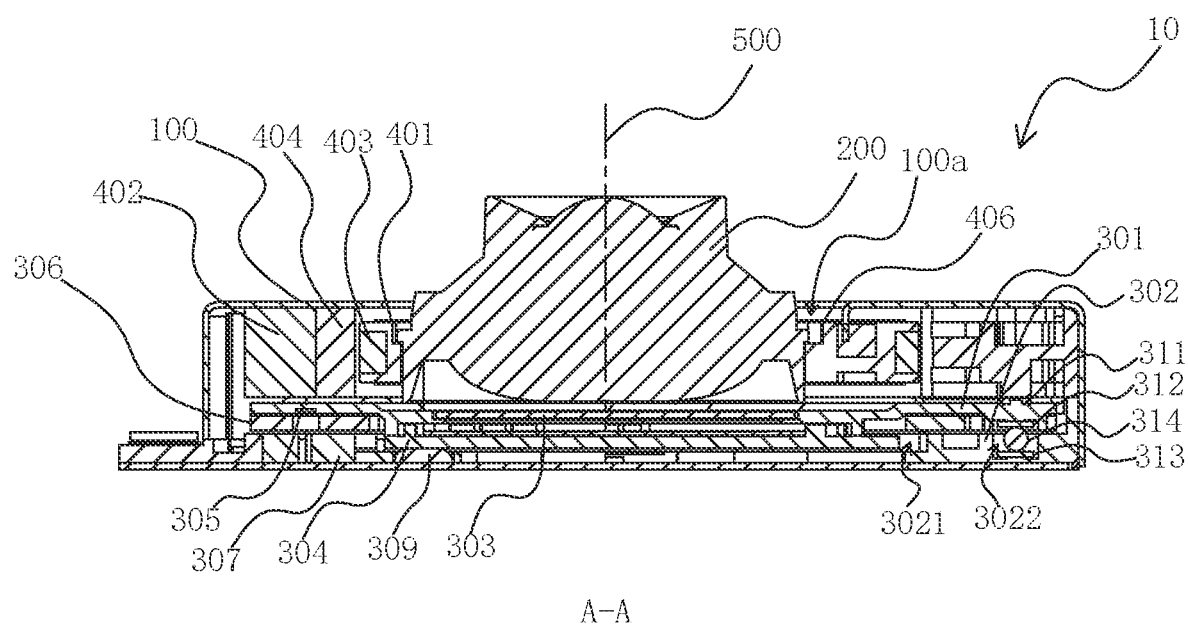
FIG. 5 is a sectional view of FIG. 4 along A-A direction.

Further, as shown in FIG. 5, the first magnet 307, the first coil 306 and the second magnet 404 are successively arranged at intervals along the optical axis direction. The first magnet 307, the first coil 306 and the second magnet 404 are successively arranged along the direction of the optical axis 500. The first coil 306 is simultaneously acted by the first magnet 307 and the second magnet 404 to drive the first movable part 301 to move.

By arranging the first magnet 307, the first coil 306 and the second magnet 404 at intervals along the optical axis direction, and by arranging the first coil 306 between the first magnet 307 and the second magnet 404, the first coil 306 can simultaneously use the magnetic fluxes of both the first magnet 307 and the second magnet 404. As a result, the first movable part 301 having the first coil 307 can receive a larger driving force, thereby improving the efficiency of anti-shake correction of the camera.

Further, multiple groups of first magnets 307 and multiple groups of second magnets 404 are provided. The multiple groups of first magnets 307 and the multiple groups of second magnets 404 are arranged in a one-to-one correspondence around the optical axis 500. Each group of first magnets 307 includes two magnets arranged perpendicular to the optical axis 500. The two first magnets 307 have opposite magnetization directions along the direction of the optical axis 500. Each group of second magnets 404 is magnetized along the direction perpendicular to the optical axis 500, and each group of second magnets 404 and one of the corresponding group of first magnets 307 that is facing the second magnet 404 have opposite magnetic pole distribution directions.

Figure 10:
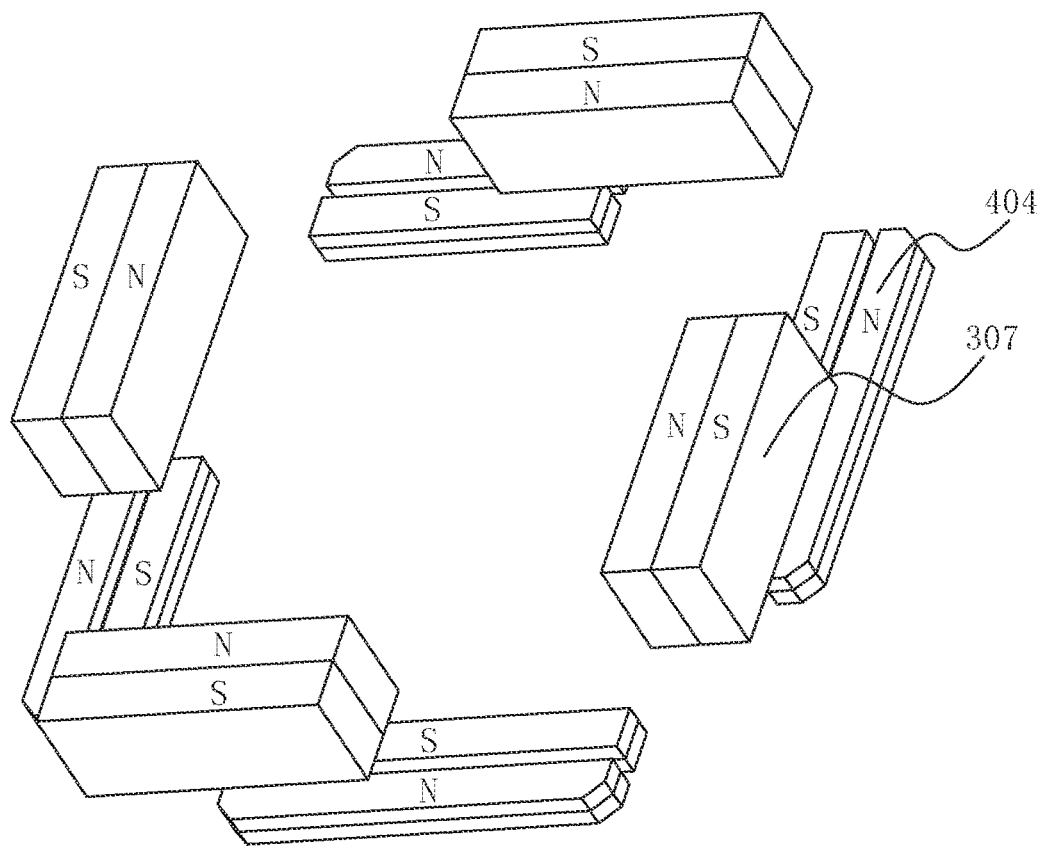
FIG. 10 is a perspective view of a positional relationship between a first magnet and a second magnet of a camera device according to an embodiment of the present disclosure.

In some embodiments, as shown in FIG. 10, the first magnet 307 has two layers in the optical axis direction, the polarities of the two layers of the first magnet 307 are opposite to each other. The S pole of the layer close to the second magnet 404 is closer to the lens 200 than the N pole, and the S pole of the layer away from the second magnet 404 is further away from the lens 200 than the N pole.

Figure 11:
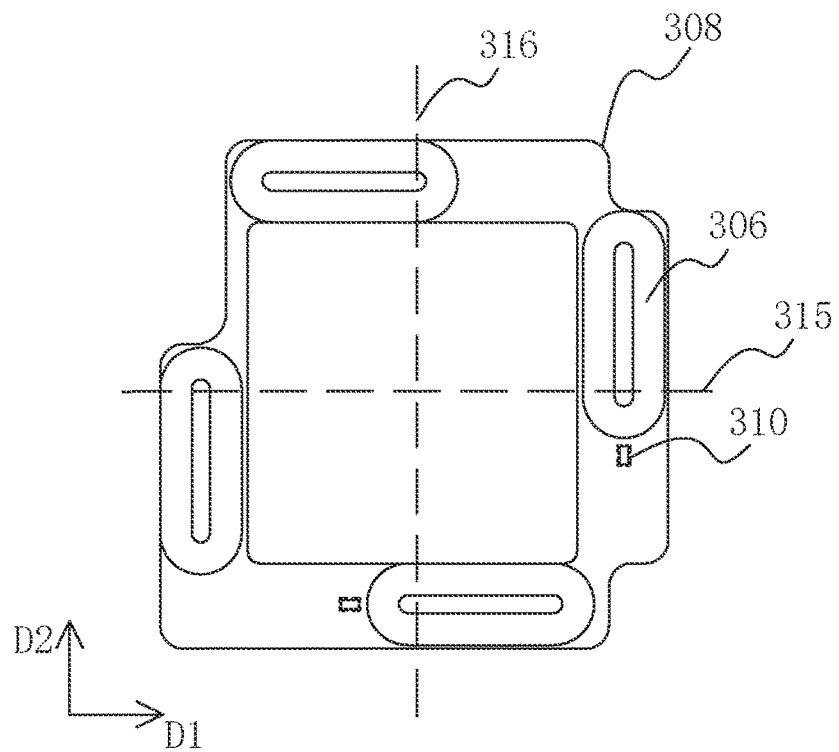
FIG. 11 is a top view of a positional relationship of a first coil of a camera device according to an embodiment of the present disclosure.

Further, referring to FIG. 11, the first movable part 301 can translate in the first direction D1 and the second direction D2 orthogonal to the direction of the optical axis 500 and can rotate in a plane defined by the first direction D1 and the second direction D2. The first direction D1 is perpendicular to the second direction D2. The anti-shake mechanism 300 has a first axis 315 parallel to the first direction D1 and a second axis 316 parallel to the second direction D2, and the optical axis 500 passes through the intersection point of the first axis 315 and the second axis 316. Multiple groups of first coils 306 are provided. The multiple groups of first coils 306 are arranged around the optical axis and are rotationally symmetrical about the intersection point, and the multiple groups of first coils 306 are asymmetrically distributed with respect to the first axis 315 and the second axis 316. The first coil 306 can change the direction of rotation of the first movable part 301 by changing the direction of the current, so that the first movable part 301 can perform clockwise rotation and counterclockwise rotation in a plane orthogonal to the optical axis 500.

Figure 6:
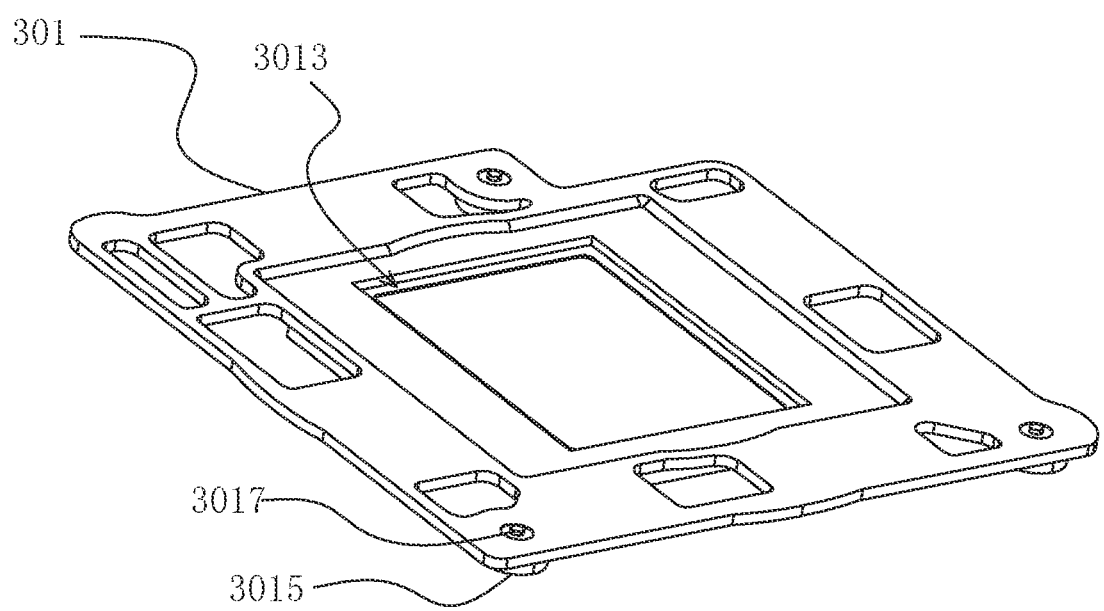
FIG. 6 is a perspective view of a first movable part of a camera device according to an embodiment of the present disclosure.
Figure 7:
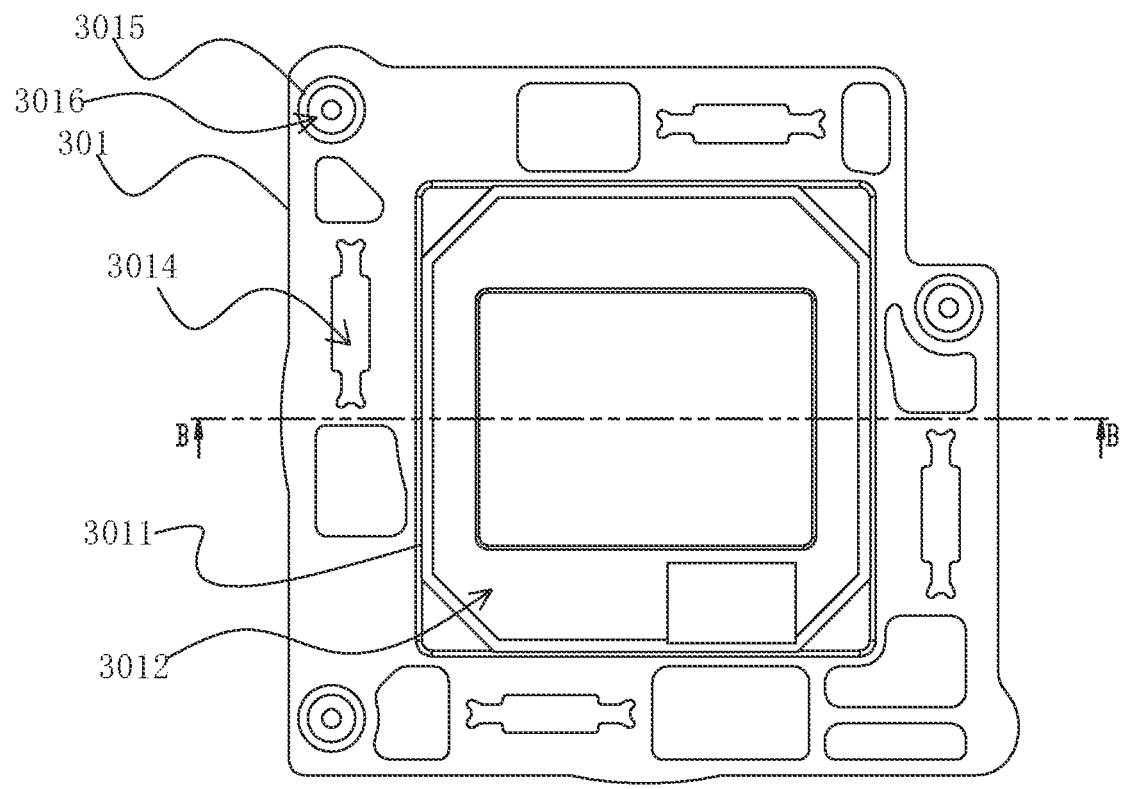
FIG. 7 is a rear view of a first movable part of a camera device according to an embodiment of the present disclosure.
Figure 8:
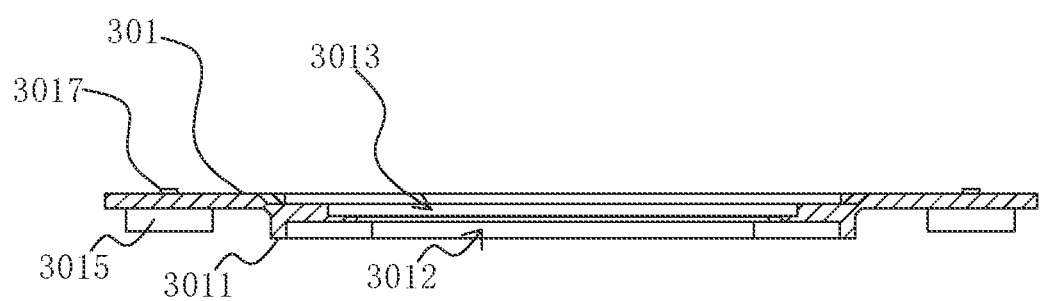
FIG. 8 is a sectional view of FIG. 7 along B-B direction.

Further, as shown in FIGS. 6 to 8, in some embodiments, the main body of the first movable part 301 is a plate-like structure, and the main body of the first movable part 301 is provided with a first protrusion 3011 on the backlight side in the direction of the optical axis 500. The first protrusion 3011 is optionally located in the middle of the first movable part 301. The photosensitive sensor 304 is fixed on the first protrusion 3011 and can move synchronously with the movement of the first movable part 301. A first groove 3012 is recessed on the end surface of the protrusion 3011 away from the first movable part 301. The first groove 3012 is configured to accommodate a partial structure of the photosensitive sensor 304, so that one end of the photosensitive sensor 304 extends into the first groove 3012. Therefore, the space occupied by the photosensitive sensor 304 in the direction of the optical axis 500 can be further compressed and, at the same time, the photosensitive sensor 304 can be protected. The shape and size of the first groove 3012 can be determined according to the shape and size of the photosensitive sensor 304, which is not limited herein.

A second groove 3021 is recessed on the light-receiving side of the first fixed part 302 in the direction of the optical axis 500. The second groove 3021 corresponds to the first groove 3012. The second groove 3021 is configured to accommodate a partial structure of the photosensitive sensor 304, so that one end of the photosensitive sensor 304 extends into the second groove 3021. The space occupied by the photosensitive sensor 304 in the direction of the optical axis 500 can be further compressed and, at the same time, the photosensitive sensor 304 can be protected. The shape and size of the second groove 3021 can be determined according to the shape and size of the photosensitive sensor 304, which is not limited herein. Those skilled in the art can understand that the inner diameter of the second groove 3021 is larger than the photosensitive sensor 304 extending therein, so that the lateral movement of the photosensitive sensor 304 in the second groove 3021 is not blocked, to prevent the movement of the photosensitive sensor 304 from being limited by the inner wall of the second groove 3021.

By accommodating the photosensitive sensor 304 in the first groove 3012 and the second groove 3021, the projection of the photosensitive sensor 304 in the direction of the optical axis 500 overlaps the first movable part 301 and the first fixed part 302. The thicknesses of the first movable part 301, the first fixed part 302 and the photosensitive sensor 304 are overlapped, thereby reducing the space occupied by the photosensitive sensor 304, which is beneficial to the miniaturization of the camera device 10, the reduction of components of the photosensitive sensor 304 and the improvement of the perpendicularity of the photosensitive sensor 304 with respect to the optical axis 500. Moreover, the undesired inclination of the photosensitive sensor 304 with respect to the optical axis 500, the mounting deviation of the photosensitive sensor 304 in the plane are also alleviated, and the overall rigidity of the photosensitive sensor 304 as well as the protection against falling shocks can be improved.

Further, referring to FIGS. 6 to 8, a stepped groove 3013 is provided penetrating through the light-receiving side of the first movable part 301 in the direction of the optical axis 500, and corresponds to the position of the first protrusion 3011. The groove 3013 corresponds to the first groove 3012 and penetrates to communicate with the first groove 3012. The filter 303 is fixed in the stepped groove 3013. The filter 303 and the photosensitive sensor 304 are relatively spaced along the direction of the optical axis 500. The filter 303 is closer to the light-receiving side along the direction of the optical axis 500. The projection of the filter 303 in the direction of the optical axis 500 overlaps the first movable part 301. By overlapping the thicknesses, the space occupied by the filter 303 is reduced, which is beneficial to the miniaturization of the camera device 10, the reduction of components of the filter 303 and the improvement of the perpendicularity of the filter 303 with respect to the optical axis 500. Moreover, the undesired inclination of the filter 303 with respect to the optical axis 500, the mounting deviation of the filter 303 in the plane are also alleviated, and the overall rigidity of the filter 303 as well as the protection against falling shocks can be improved.

Further, as shown in FIG. 5, the first movable part 301 is disposed on the light-receiving side of the first fixed part 302 in the direction of the optical axis 500. The first coil 306 is fixed on one side of the first movable part 301 facing the first fixed part 302. The first coil 306 is arranged around the photosensitive sensor 304. The first magnet 307 is fixed on the side of the first fixed part 302 facing the first movable part 301. The first magnet 307 one-to-one corresponds to the first coil 306. In some embodiments, multiple first magnets 307 and multiple first coils 306 are provided, and the multiple first magnets 307 and the multiple first coils 306 are in one-to-one correspondence. Optionally, four first coils 306 are arranged at equal intervals by taking the photosensitive sensor 304 as the center. Those skilled in the art can understand that the number and distribution of the first coils 306 can be determined according to the actual situation, which is not limited herein.

Further, referring to FIG. 5 and FIG. 7, a third groove 3014 is recessed on the backlight side of the first movable part 301 in the direction of the optical axis 500, and a yoke 305 is fixed in the third groove 3014. The yoke 305 one-to-one correspond to the magnet 307. The yoke 305 is disposed in the third groove 3014, so that the surface of the yoke 305 is lower than the surface of the first movable part 301, which is also beneficial to the miniaturization of the camera device 10.

The yoke 305 is attached to the first movable part 301 and has a structure tended to be pulled closer to the center of the first magnet 307, so as to achieve the magnetic spring effect of pulling the anti-shake mechanism 300 closer toward the optical axis 500 by the yoke 305 and the first magnet 307. The yoke 305 and the first magnet 307 interact with each other to effectively eliminate looseness, which can reduce the inclination of the first movable part 301 relative to the optical axis 500, and achieve motion reset as well as compressing the ball 314.

Further, referring to FIGS. 5 to 8, a second protrusion 3015 is protruded from the backlight side of the first movable part 301 in the direction of the optical axis 500, and a fourth groove 3016 is recessed on the end surface of the second protrusion 3015 facing away from the first movable part 301. A first plate 312 is disposed in the fourth groove 3016, and the first plate 312 is fixed on the bottom surface of the fourth groove 3016.

A fifth groove 3022 is recessed on the light-receiving side of the first fixed part 302 in the direction of the optical axis 500. The fifth groove 3022 one-to-one corresponds to the fourth groove 3016. The plate 313 is fixed to the bottom surface of the fifth groove 3022.

The ball 314 is arranged between the first plate 312 and the second plate 313. Multiple first plates 312, multiple second plates 313 and multiple balls 314 are provided. The multiple first plates 312, multiple second plates 313 and multiple balls 314 are in one-to-one correspondence, so as to provide a balanced and evenly distributed support force to prevent the first movable part 301 from tilting during movement. One end of the ball 314 close to the first movable part 301 extends into the fourth groove 3016 and is in rolling connection with the first plate 312, and one end of the ball 314 close to the first fixed part 302 extends into the fifth groove 3022 and is in rolling connection with the second plate 313, so that the first movable part 301 can reciprocate in a plane orthogonal to the direction of the optical axis 500.

By accommodating the ball 314 in the fourth groove 3016 and the fifth groove 3022, the movement of the ball 314 can be limited, so as to prevent the excessive movement of the first movable part 301. There is an overlapping area between the projection of the ball 314 in the direction of the optical axis 500 and the first movable part 301 and the first fixed part 302, so that the thicknesses of the first movable part 301, the first fixed part 302 and the thickness of the ball 314 are overlapped, thereby reducing the occupied space of the ball 314 and thus is beneficial for the miniaturization of the camera device 10 and the improvement of the protective effect against the impact of falling.

Further, as shown in FIG. 5, a third protrusion 3017 is protruded from the light-receiving side of the first movable part 301 in the direction of the optical axis 500. In some embodiments, multiple third protrusions 3017 are provided, and third protrusions 3017 are arranged on the first movable part 301 at annular intervals, so as to provide balanced and dispersed buffering and supporting. Those skilled in the art can understand that, the number and distribution of the third protrusions 3017 can be determined according to the actual situation, which is not limited herein. A first shockproof buffer 311 is optionally a shock-absorbing gel, which can achieve more accurate anti-shake function by producing shock-absorbing effect for the sudden power-on pulse control of the anti-shake mechanism 300.

Further, the optical imaging part and the anti-shake structure 300 are detachably abutted along the direction of the optical axis 500. The motion driven by the driving mechanism 400 of the optical imaging part and the motion driven and guided by the anti-shake structure 300 will not interfere or influence each other. Therefore, the anti-shake structure 300 according to the present disclosure can be freely combined with optical imaging parts of various structures and different driving modes.

In some embodiments, as shown in FIG. 1, the first flexible conductive substrate 308 is equipped with a first position detection element 310 capable of detecting the magnetic flux of the first magnet 307. Optionally, at least two first position detection elements 310 are provided. By detecting the magnetic flux of the first magnet 307, accurate position detection and anti-shake control can be performed for the first movable part 301.

According to the technical solutions of the above-mentioned embodiments, the purpose of realizing a more efficient anti-shake mechanism 300 in the portable electronic device with the characteristic of miniaturization can be achieved, and the quality of the captured image can be improved.

Figure 9:
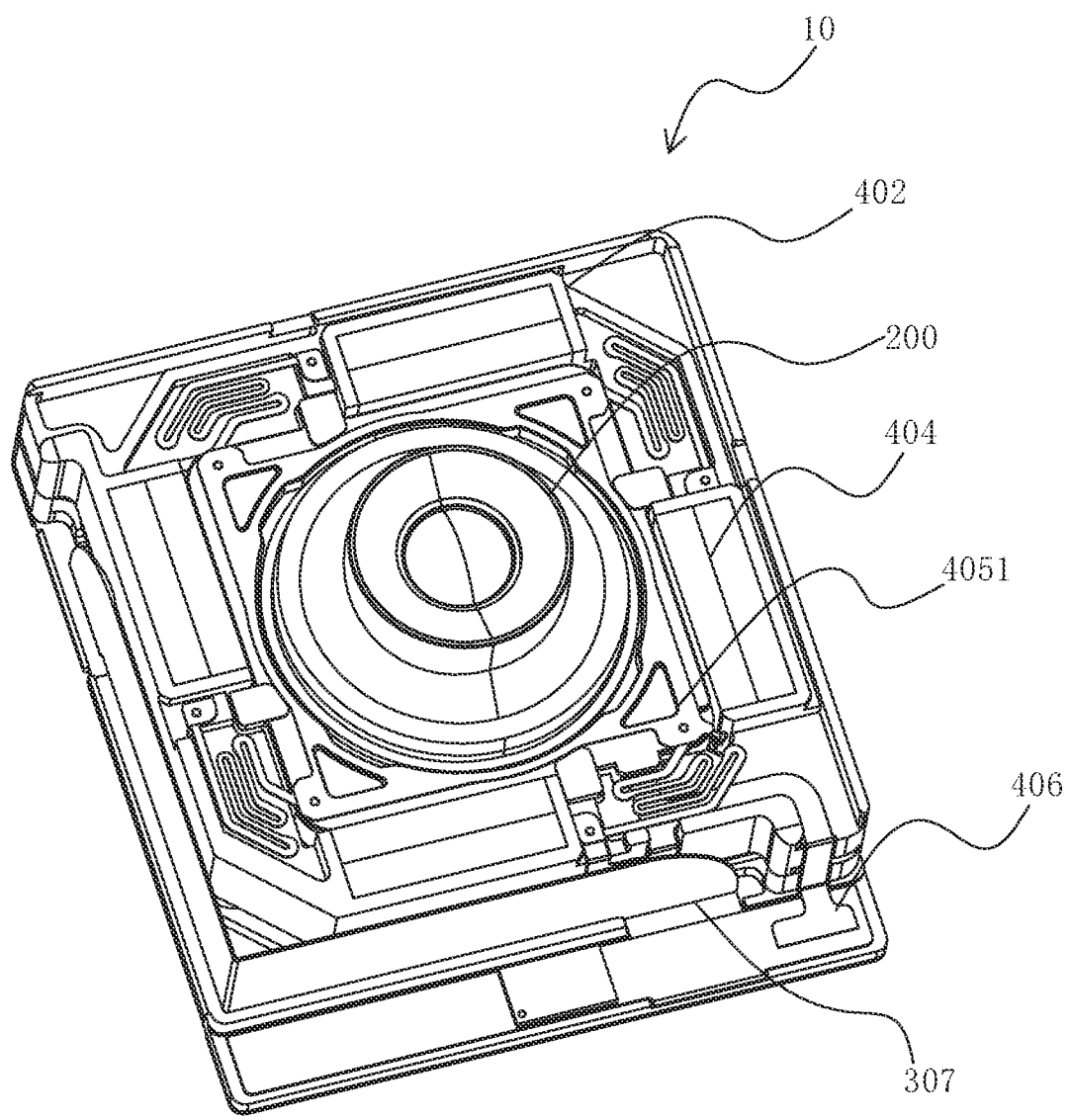
FIG. 9 is a perspective view of an overall structure of a hidden portion of a housing of a camera device according to an embodiment of the present disclosure.

Referring to FIGS. 1, 5 and 9, the optical imaging part is an auto-focusing lens structure, and the driving mechanism 400 includes a second movable part 401, a second fixed part 402, an elastic support part 405 and a second coil 403. The second movable parts 401 can reciprocate along the direction of the optical axis 500, and both the lens 200 and the second coil 403 are connected to the second movable part 401.

A cylindrical through groove runs through the middle portion of the second movable part 401. The lens 200 is fixed on the inner circumferential surface of the through groove by bonding, screwing or by other connection manners. The second coil 403 is an air-core coil that is energized during focusing. When observing along the direction of the optical axis 500, the second coil 403 is a polygon structure, such as a quadrilateral structure. The second coil 403 is wrapped around the outer wall surface of the second movable part 401. When observing along the direction of the optical axis 500, the second fixed part 402 is a square frame structure, and the second movable part 401 extends into the frame of the second fixed part 402. The second magnets 404 are arranged on the inner wall surface of the second fixed part 402, and the second magnets 404 are arranged around the second coil 403.

Two ends of the elastic support part 405 are connected to the second movable part 401 and the second fixed part 402, respectively, so as to suspend the second movable part 401 in the accommodation cavity 100a. Through their respective elasticity, the lens 200 is kept in the suspended state with the application of electromagnetic force.

In some embodiments, the elastic support part 405 includes an upper leaf spring 4051 and a lower leaf spring 4052. The upper leaf spring 4051 is located on the side of the second movable part 401 close to the light-receiving side in the direction of the optical axis 500. The two ends are respectively connected with the upper end surfaces of the second movable part 401 and the second fixed part 402. The upper end surfaces of the second movable part 401 and the second fixed part 402 are provided with several positioning protrusions, and the upper leaf spring 4051 is provided with positioning through grooves matching with the positioning protrusions. Similarly, the lower leaf spring 4052 is located on the side of the second movable part 401 away from the light-receiving side in the direction of the optical axis 500. The lower leaf spring 4052 is arranged opposite to the upper leaf spring 4051. Two ends of the lower leaf spring 4052 are respectively connected with the lower end surfaces of the second movable part 401 and the second fixed part 402. The lower end surfaces of the second movable part 401 and the second fixed part 402 are provided with several positioning protrusions, and the lower leaf spring 4052 is provided with positioning through grooves matching with the positioning protrusions.

The working principle of the above-mentioned driving mechanism 400 is as follows: the second coil 403 is energized, and through the interaction between the magnetic field of the second magnet 404 and the current flowing in the second coil 403, a Lorentz force is generated in the second coil 403. The direction of the Lorentz force is a direction orthogonal to the direction of the magnetic field of the second magnet 404 and the direction of the current flowing in the second coil 403. Since the second magnet 404 is fixed, a reaction force acts on the second coil 403. This reaction force becomes the driving force of the second movable part 401, and the second movable part 401 having the second coil 403 moves in the direction of the optical axis 500 to perform focusing.

Further, referring to FIG. 1 and FIG. 5, the driving mechanism 400 is further provided with a second flexible conductive substrate 407. The second flexible conductive substrate 407 is equipped with a second position detection element 406 capable of detecting the magnetic flux of the second magnet. By detecting the magnetic flux of the second magnet 404, accurate position detection and focus control can be performed on the lens 200. The second coil 403, the signal lines and the power lines of the second position detection element 406 can be arranged at the outside of the driving mechanism 400 through the second flexible conductive substrate 407. Optionally, the second flexible conductive substrate 407 is integrated with the first flexible conductive substrate 308. Furthermore, when a driving integrated circuit is mounted on the first flexible conductive substrate 308, energization for driving the movement of the lens 200, servo control for feeding back the signal of the second position detection element 406 can be performed.

Further, as shown in FIG. 1, the second movable part 401 is provided with a second shockproof buffer 408, and the second shockproof buffer 408 is optionally a shock-absorbing gel, which can achieve more accurate anti-shake function by producing shock-absorbing effect for the sudden power-on pulse control of the lens 200.

In the related art, there is a further technical problem that is as the size of the imaging assembly increases, the heat generation increases. In the anti-shake mechanism 300 for shockproof of the imaging assembly, the heat dissipation becomes a problem. There may be a case where the movement is restricted and the elements are damaged due to the heat generation of the imaging assembly itself. In order to solve the technical problem of heat dissipation of the imaging assembly, at least a part of the housing 100 is made of a metal material with high thermal conductivity, and this part is optionally arranged adjacent to the photosensitive sensor 304, for example, located on the bottom wall 102, or the bottom wall 102 is made of metal as a whole. The accommodation cavity 100*a* is provided with a thermal conductive member 309, and the thermal conductive member 309 is in contact with the photosensitive sensor 304 and the housing 100, to conduct the heat of the photosensitive sensor 304 to the housing 100.

Therefore, there is no need to adopt a new heat dissipation structure or use more components such as a fan for air circulation for heat dissipation, so this embodiment has the technical advantages of reducing damage of the photosensitive sensor 304, performing good heat dissipation effect, and achieving miniaturization.

In some embodiments, the thermal conductive member 309 is a heat dissipation gel, which can efficiently transfer the heat emitted from the photosensitive sensor 304 to the housing 100, and can achieve more accurate anti-shake function by producing shock-absorbing effect for the sudden power-on pulse control of the anti-shake mechanism 300. Those skilled in the art may understand that the thermal conductive member 309 also has other implementing manners, which are not listed herein.

Figure 12:
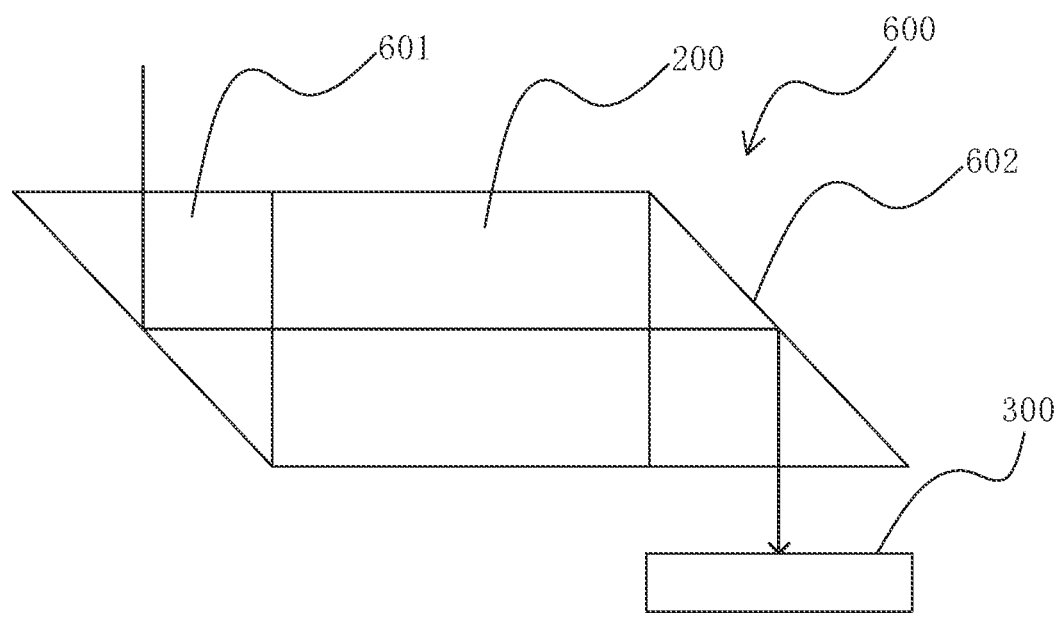
FIG. 12 is a schematic structural diagram of a periscope lens structure according to an embodiment of the present disclosure.

The optical imaging part of the foregoing embodiments is an auto-focusing lens structure. In some embodiments, as shown in FIG. 12, the above-mentioned anti-shake mechanism 300 can also be applied to the optical imaging part of a periscope lens structure 600. The lens structure 600 further includes a first prism 601 on the object side of the lens 200 and/or a second prism 602 on the image side of the lens 200. The first prism 601 and the second prism 602 are configured to change the direction of the light path. By arranging the first prism 601 and/or the second prism 602 capable of changing the optical path, it is beneficial to reduce the volume of the camera device, thereby facilitating the miniaturization and portability of the camera device.

Figure 13:
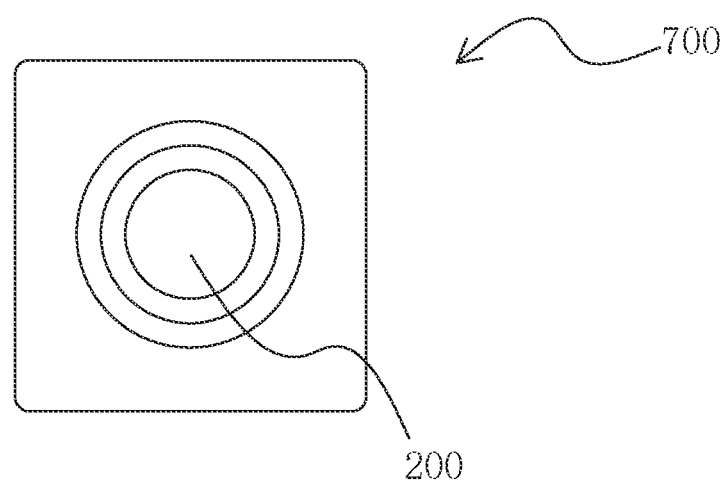
FIG. 13 is a schematic structural diagram of a zoom lens structure according to an embodiment of the present disclosure.
Figure 14:
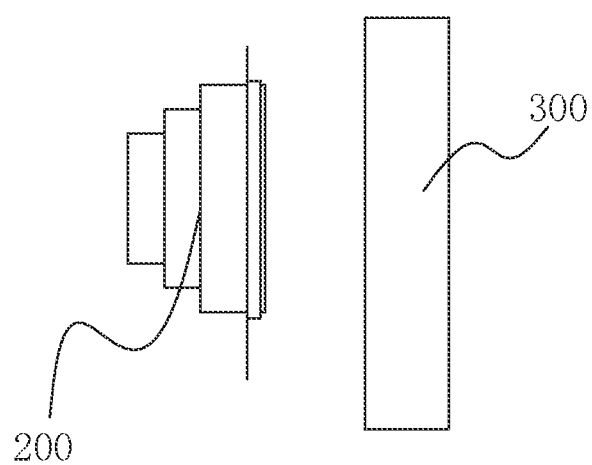
FIG. 14 is a schematic diagram showing lens zooming of a zoom lens structure of an embodiment according to the present disclosure.

Referring to FIGS. 13 and 14, the above-mentioned anti-shake mechanism 300 can also be applied to the optical imaging part of a zoom lens structure 700. The lens 200 includes at least two lenses arranged at intervals along the optical axis direction, and the zoom lens structure 700 can change the distance between the two lenses along the direction of the optical axis 500. For example, the lens 200 includes a plurality of lenses to perform telescopic motion. By arranging the zoom lens structure 700, it is beneficial to improving the shooting effect of the camera device, and thus improving the user's experience.

Figure 15:
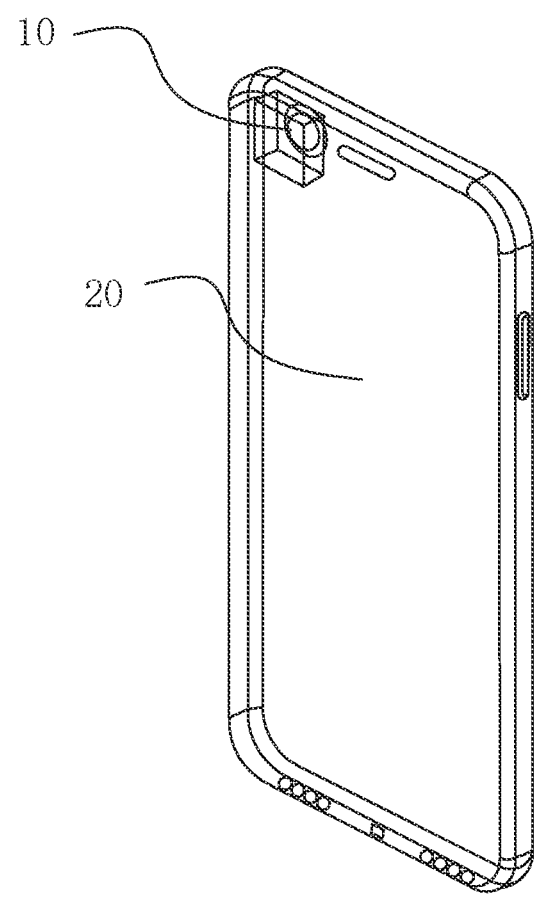
FIG. 15 is a perspective view of a portable electronic device according to an embodiment of the present disclosure.

Based on the above embodiments, referring to FIG. 15, the present disclosure further provides a portable electronic device 20, such as a smart phone or a tablet device, which includes the aforementioned camera device 10.

The structure, features, and effects according to the present disclosure are described in detail above based on the embodiments shown in the drawings. The above are only preferred embodiments of the present disclosure. However, the above embodiment do not limit the scope of the present disclosure. Any changes or equivalent embodiments which still do not exceed the concept covered by the specification and illustrations should fall within the protection scope of the present disclosure.

What is claimed is:

1. A camera device, comprising:
   a housing having an accommodation cavity;
   an optical imaging part placed in the accommodation cavity, the optical imaging part comprising a lens having an optical axis and a drive mechanism configured to drive the lens; and
   an anti-shake mechanism placed in the accommodation cavity, the anti-shake mechanism comprising a first movable part, a first fixed part, a first coil, a first magnet, a filter and a photosensitive sensor,
   wherein the first movable part is supported on the first fixed part by a ball in a rolling manner, the first coil, the filter and the photosensitive sensor are fixed to the first movable part, the first magnet is fixed to the first fixed part, and the first magnet and the first coil are spaced apart from each other,
   the drive mechanism comprises a second magnet configured to drive the lens, and
   the first magnet, the first coil and the second magnet are successively arranged at intervals along an optical axis direction, and the first coil is simultaneously under action of the first magnet and the second magnet to drive the first movable part.

2. The camera device according to claim 1, wherein a plurality of groups of first magnets and a plurality of groups of second magnets are provided, the plurality of groups of first magnets and the plurality of groups of second magnets are arranged in one-to-one correspondence surrounding the optical axis, wherein each group of first magnets comprises two first magnets arranged along a direction perpendicular to the optical axis direction, and the first magnets have opposite magnetization directions along the optical axis direction; each group of second magnets is magnetized along the direction perpendicular to the optical axis direction, and each group of second magnets and a corresponding group of first magnets that is facing the group of second magnets have opposite magnetic pole distribution directions.

3. The camera device according to claim 1, wherein the first movable part is able to translate in a first direction and a second direction that are orthogonal to the optical axis direction and is able to rotate in a plane defined by the first direction and the second direction, and the first direction is perpendicular to the second direction; the anti-shake mechanism has a first axis parallel to the first direction and a second axis parallel to the second direction, the optical axis passes through an intersection point of the first axis and the second axis; and a plurality of groups of first coils are provided and arranged around the optical axis, the plurality of groups of first coils are rotationally symmetrical about the intersection point, and the plurality of groups of first coils are asymmetrically distributed with respect to the first axis and the second axis.

4. The camera device according to claim 1, wherein the optical imaging part has an auto-focusing lens structure, and the driving mechanism further comprises a second movable part, a second fixed part, an elastic support part and a second coil; the lens and the second coil are fixed to the second movable part, the second magnet is fixed to the second fixed part, the second magnet and the second coil are spaced apart from each other, and two ends of the elastic support part are respectively connected to the second movable part and the second fixed part, so as to suspend the second movable part in the accommodation cavity.

5. The camera device according to claim 1, wherein the optical imaging part abuts the anti-shake structure in a detachable manner along the optical axis direction.

6. The camera device according to claim 1, wherein the optical imaging part is a periscope lens structure or a zoom lens structure.

7. The camera device according to claim 1, wherein a first protrusion protrudes from a backlight side of the first movable part in the optical axis direction, and a first groove is recessed on an end surface of the first protrusion away from the first movable part;

a second groove is recessed on a light-receiving side of the first fixed part in the optical axis direction, and the second groove corresponds to the first groove;

the photosensitive sensor is fixed on the first protrusion, one end of the photosensitive sensor extends into the first groove, and the other end of the photosensitive sensor extends into the second groove; and a stepped groove runs through the light-receiving side of the first movable part in the optical axis direction, and the stepped groove corresponds to the first groove and penetrates to communicate with the first groove, the filter is fixed in the stepped groove, and the filter and the photosensitive sensor are arranged at intervals along the optical axis direction.

8. The camera device according to claim 7, wherein a third groove is recessed on the backlight side the first movable part in the optical axis direction, a yoke is fixed in the third groove, and the yoke is in one-to-one correspondence with the first magnet.

9. The camera device according to claim 1, wherein a second protrusion protrudes from a backlight side of the first movable part in the optical axis direction, and a fourth groove is recessed on an end surface of the second protrusion away from the first movable part, and a first plate is arranged in the fourth groove;

a fifth groove is recessed on a light-receiving side of the first fixed part in the optical axis direction, the fifth groove corresponds to the fourth groove, and a second plate is arranged in the fifth groove; and the ball is arranged between the first plate and the second plate, one end of the ball close to the first movable part extends into the fourth groove and is in rolling connection with the first plate, and one end of the ball close to the first fixed part extends into the fifth groove and is in rolling connection with the second plate, so that the first movable part is able to reciprocate in a plane orthogonal to the optical axis direction.

10. A portable electronic device, comprising a camera device, wherein the camera device comprises:

a housing having an accommodation cavity;

an optical imaging part placed in the accommodation cavity, the optical imaging part comprising a lens having an optical axis and a drive mechanism configured to drive the lens; and an anti-shake mechanism placed in the accommodation cavity, the anti-shake mechanism comprising a first movable part, a first fixed part, a first coil, a first magnet, a filter and a photosensitive sensor, wherein the first movable part is supported on the first fixed part by a ball in a rolling manner, the first coil, the filter and the photosensitive sensor are fixed to the first movable part, the first magnet is fixed to the first fixed part, and the first magnet and the first coil are spaced apart from each other, the drive mechanism comprises a second magnet configured to drive the lens, and the first magnet, the first coil and the second magnet are successively arranged at intervals along an optical axis direction, and the first coil is simultaneously under action of the first magnet and the second magnet to drive the first movable part.

\* \* \* \* \*